United States Patent
Isonuma

(10) Patent No.: US 9,215,616 B2
(45) Date of Patent: Dec. 15, 2015

(54) BASE STATION DEVICE, DATA TRANSMISSION CONTROL METHOD, AND DATA TRANSMISSION CONTROL SYSTEM

(71) Applicant: FUJITSU LIMITED, Kawasaki-shi, Kanagawa (JP)

(72) Inventor: Yutaka Isonuma, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 14/025,012

(22) Filed: Sep. 12, 2013

(65) Prior Publication Data

US 2014/0016631 A1   Jan. 16, 2014

Related U.S. Application Data

(63) Continuation of application No. PCT/JP2011/056650, filed on Mar. 18, 2011.

(51) Int. Cl.
*H04L 1/00* (2006.01)
*H04W 28/06* (2009.01)
*H04W 4/18* (2009.01)
*H04W 4/06* (2009.01)
*H04W 76/00* (2009.01)

(52) U.S. Cl.
CPC .............. *H04W 28/06* (2013.01); *H04W 4/06* (2013.01); *H04W 4/18* (2013.01); *H04W 76/002* (2013.01)

(58) Field of Classification Search
CPC ..... H04M 3/561; H04M 3/562; H04M 3/563; H04M 3/564
USPC .................................. 370/260, 338, 329, 341
See application file for complete search history.

(56) References Cited

U.S. PATENT DOCUMENTS

| | | | |
|---|---|---|---|
| 2006/0221963 A1 | 10/2006 | Takayanagi et al. | |
| 2008/0098283 A1* | 4/2008 | Vayanos et al. | 714/774 |
| 2009/0082033 A1 | 3/2009 | Sasaki et al. | |

FOREIGN PATENT DOCUMENTS

| | | |
|---|---|---|
| EP | 1 752 886 A1 | 2/2007 |
| EP | 2 106 181 A2 | 9/2009 |
| JP | 2000-138968 | 5/2000 |

(Continued)

OTHER PUBLICATIONS

International Search Report issued for corresponding international patent application PCT/JP2011/056650, mailed Jun. 21, 2011.

(Continued)

*Primary Examiner* — Dady Chery
(74) *Attorney, Agent, or Firm* — Myers Wolin, LLC

(57) ABSTRACT

A base station device receives an acquisition request for data from a first terminal and transmits, to the first terminal, data associated with the acquisition request. At this point, while the base station device is in the process of transmitting the requested data to the first terminal by using a first transmission line, the base station device receives, from a second terminal, an acquisition request for data that is the same as the requested data. In such a case, the base station device transmits, to both the first terminal and the second terminal by using the first transmission line, data that has not been transmitted to the first terminal to which the requested data is being transmitted among the requested data and transmits, to the second terminal by using a second transmission line, data that has been transmitted to the first terminal among the requested data.

8 Claims, 14 Drawing Sheets

(56) References Cited

FOREIGN PATENT DOCUMENTS

| JP | 2002-369233 | 12/2002 |
|----|-------------|---------|
| JP | 2009-077148 | 4/2009  |

OTHER PUBLICATIONS

Extended European search report with supplementary European search report and the European search opinion issued for corresponding European Patent Application No. 11861502.0, mailed on Dec. 8, 2014.

NEC, "DISC on MBMS service activation/deactivation further to counting", Agenda Item: 7.3.1.2 (LTE MBMS enhancements), 3GPP TSG-RAN2 Meeting #72, R2-106488, Jacksonville, FL (US), Nov. 15-19, 2010.

* cited by examiner

FIG.8

| RRC HEADER PORTION | Message type | |
|---|---|---|
| RRC PAYLOAD PORTION | TRANSACTION ID | |
| | DATA INFORMATION | MESSAGE ID |
| | | DOWNLOAD DATA IDENTIFICATION INFORMATION |
| | | NUMBER OF USED CHANNELS |
| | | RANGE OF SEQUENCE NUMBERS OF TRANSMISSION DATA (CHANNEL 1) |
| | | RANGE OF SEQUENCE NUMBERS OF TRANSMISSION DATA (CHANNEL 2) |
| | CHANNEL 1 INFORMATION | CHANNEL ID |
| | | USED RNTI |
| | | CHANNEL INFORMATION |
| | CHANNEL 2 INFORMATION | CHANNEL ID |
| | | USED RNTI |
| | | CHANNEL INFORMATION |

FIG.11

| AP SERVER-SIDE INFORMATION | TERMINAL-SIDE INFORMATION | | MEMORY INFORMATION | |
|---|---|---|---|---|
| DOWNLOAD DATA IDENTIFICATION INFORMATION | MESSAGE ID | DIVIDED COUNT | DATA STORE ADDRESS | SIZE |
| http://www.xxx.co.jp/aaa/ggg | 1 | 1520 | 8000 0000 | xxx |
| http://www.yyy.co.jp/bbb/hhh | 2 | 23 | 8000 2EF0 | xxx |
| http://www.zzz.co.jp/ccc/iii | 3 | 6 | 8000 10F0 | xxx |
| http://www.aaa.co.jp/ddd/jjj | 4 | 252 | 8000 3640 | xxx |
| http://www.bbb.co.jp/eee/kkk | 5 | 9 | 8000 2900 | xxx |
| http://www.ccc.co.jp/fff/lll | 6 | 299 | 8000 E620 | xxx |
| | | | | |
| | | | | |

| DATA | TIMER VALUE (T) | DELETION PRIORITY ORDER |
|---|---|---|
| A | 5233 | 1 |
| B | 1924 | 3 |
| C | 2520 | 2 |

FIG.17

| DATA | TIMER VALUE (T) | USE TIME (N) | N/T | DELETION PRIORITY ORDER |
|---|---|---|---|---|
| A | 5233 | 252 | 0.04816 | 3 |
| B | 1924 | 32 | 0.01663 | 2 |
| C | 2520 | 6 | 0.00238 | 1 |

FIG.18

| DATA | TIMER VALUE (T) | DATA RETENTION PERIOD (Y) | REMAINING TIME (Y-T) | DELETION PRIORITY ORDER |
|---|---|---|---|---|
| A | 5233 | 8000 | 2767 | 2 |
| B | 1924 | 3000 | 1076 | 1 |
| C | 2520 | 6000 | 3480 | 3 |

BASE STATION DEVICE, DATA TRANSMISSION CONTROL METHOD, AND DATA TRANSMISSION CONTROL SYSTEM

CROSS-REFERENCE TO RELATED APPLICATION

This application is a continuation application of International Application PCT/JP2011/056650, filed on Mar. 18, 2011, and designating the U.S., the entire contents of which are incorporated herein by reference.

FIELD

The embodiments discussed herein are directed to a base station device, a data transmission control method, and a data transmission control system.

BACKGROUND

In recent years, with the development of highly-functional terminals, such as smart phones, there has been an increase in patterns of usage where information in, for example, newspapers, magazines, and video image streams, is downloaded via mobile communication networks and then browsed. Furthermore, if a mobile communication technology, such as the Long Term Evolution (LTE), that can cope with high speeds and offer low delays becomes widely used, the number of users who previously obtained information through papers or personal computers but now use mobile terminal to browse that information increases even if the users use mobile terminals other than smart phones. In such a case, for example, there is concern that resources will run short near main stations during commuting hours in the morning and evening due to the large amounts of information being downloaded in specific cells.

In general, pieces of information on data downloaded by multiple users are not different for each user but are basically the same. Consequently, individually transmitting such data to each terminal is not efficient in terms of the resources.

Accordingly, as a technology that efficiently uses the resources, there is a known contents distribution system, that distributes the same content to a lot of mobile terminals located in the same communication area. With this contents distribution system, if a server transmits given content to a first mobile terminal, the server also transmits the same content to a second mobile terminal that is located in the same communication area in which the first mobile terminal is located. Specifically, with this technology, multiple mobile terminals other than the mobile terminal that requested the given content also download that same content.

Patent Literature 1: Japanese Laid-open Patent Publication No. 2002-369233

However, with the related technology, because the total number of pieces of data transmitted from a server to terminals is large and because a memory with enormous capacity needs to be installed in the terminal side, there is a problem in that resources are not efficiently used.

For example, with the related contents distribution system, regardless of whether content is needed, the content is transmitted to all the terminals that could possibly use the content. Specifically, even if another mobile terminal frequently requests the content from the server, each mobile terminal needs to have a memory capacity that can download the content that is transmitted in response to each request. Consequently, a large-capacity memory is installed in each mobile terminal; therefore, it is hard to say that the resources are efficiently used.

Furthermore, with the related contents distribution system, if a single mobile terminal requests a given content when hundreds of mobile terminals are present in the same communication area, all of the other mobile terminals download the content. Consequently, the total number of pieces of data transmitted from the server to the terminals is large, and thus the resource usage increases.

SUMMARY

According to an aspect of the embodiment of the invention, a base station device, data transmission control method and data transmission control system includes a receiving unit that receives an acquisition request for data from a terminal and a transmitting unit that transmits, when the acquisition request is received by the receiving unit, the requested data to the terminal. While the transmitting unit is in the process of transmitting the requested data to the terminal by using a first transmission line and when an acquisition request for data that is the same as the requested data is received from another terminal by the receiving unit. In this case, the transmitting unit transmits, to both the terminal and the other terminal by using the first transmission line, data that has not been transmitted to the terminal among the requested data and transmits, to the other terminal by using a second transmission line, data that has been transmitted to the terminal among the requested data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a schematic diagram illustrating an example of a download information notification 2.

FIG. 11 is a schematic diagram illustrating an example of information stored in a download data table.

FIG. 17 is a schematic diagram illustrating an example of managing download data by using both the elapsed time and use frequency.

FIG. 18 is a schematic diagram illustrating an example of managing download data by using both the elapsed time and a requested retention period.

DESCRIPTION OF EMBODIMENTS

Preferred embodiments of a base station device, a data transmission control method, and a data transmission control system disclosed in the present invention will be described in detail below with reference to the accompanying drawings. The present invention is not limited to these embodiments.

[a] First Embodiment

In a first embodiment, the overall configuration of the system, the flow of processes, messages exchanged in the system, and the like will be described with reference to FIGS. 1 to 9. The configuration of the system, the number of devices, the contents of messages are only examples and are not limited thereto.

[Overall Configuration]

Figure 1:
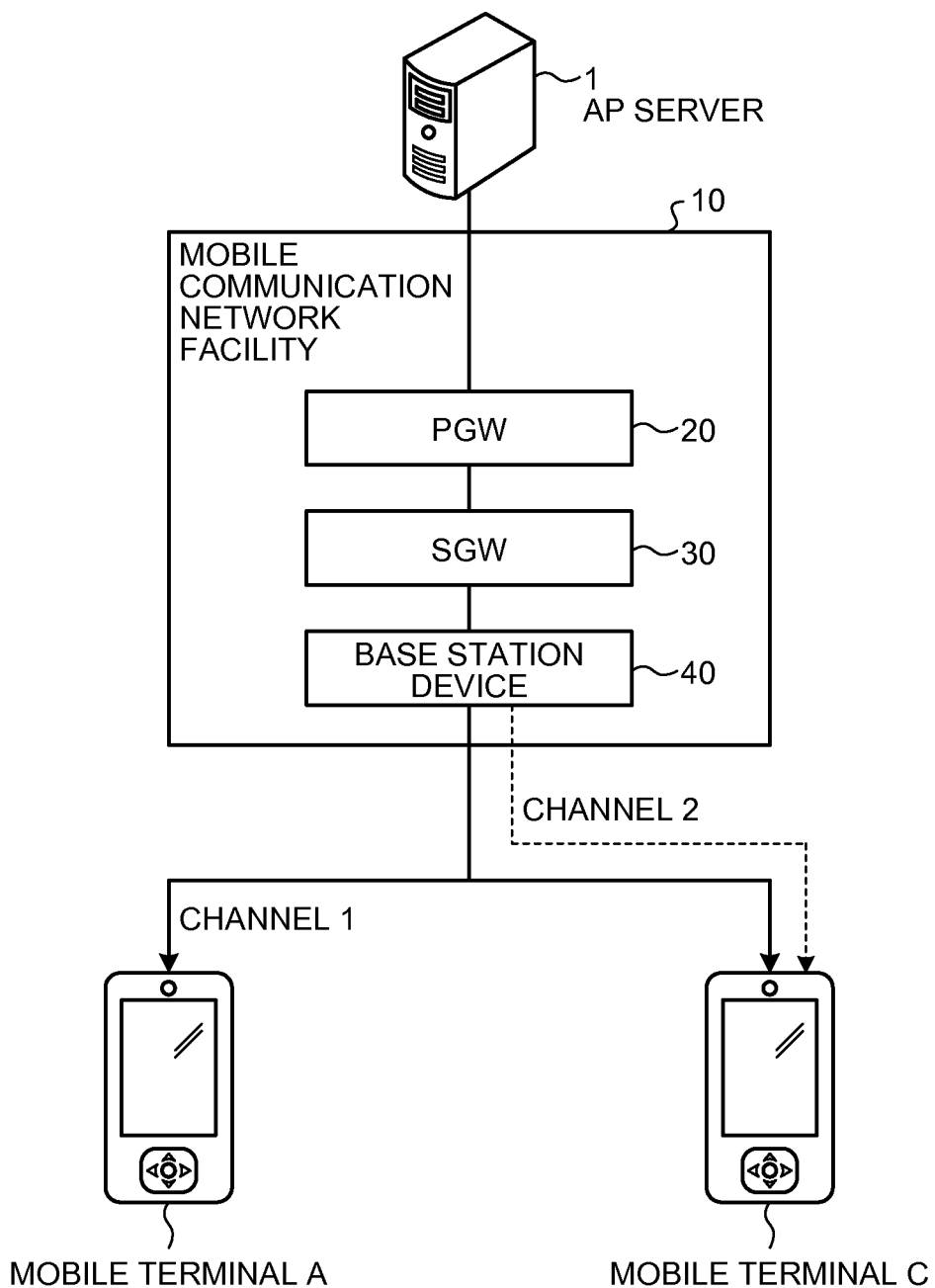
FIG. 1 is a schematic diagram illustrating the overall configuration of a system according to a first embodiment.

FIG. 1 is a schematic diagram illustrating the overall configuration of a system according to a first embodiment. As illustrated in FIG. 1, in this system, an application (AP) server 1 and a mobile communication network facility 10 are connected by a core network, the Internet, or the like. The mobile communication network facility 10, a mobile terminal A, and a mobile terminal C are connected by wireless communication networks.

The AP server 1 is a server device that retains data, such as music data and video image data, and that transmits the data to the mobile terminal A and the mobile terminal C. For example, the AP server 1 receives a download request from each mobile terminal via the mobile communication network facility 10. Then, the AP server 1 transmits data that is associated with the received download request to the request-source mobile terminal via the mobile communication network facility 10.

The mobile terminal A and the mobile terminal C are terminals, such as mobile phones, smart phones, PDAs, and the like, conforming to a high-speed data communication specification, such as the Long Term Evolution (LTE). These mobile terminals access the AP server 1 by using a hypertext transfer protocol (HTTP) communication that uses a Web screen and then transmit a download request to the AP server 1 via the Web screen or the like.

The mobile communication network facility 10 includes a packet data network gateway (PGW) 20, a serving gateway (SGW) 30, and a base station device 40 and controls, by using these devices, communication between each mobile terminal and the AP server 1.

The PGW 20 is a gateway device that connects a wireless communication network to another network. For example, the PGW 20 receives, from the SGW 30, various requests or messages transmitted through the wireless communication network by the mobile terminal A or the like and then transfers them to the AP server 1 that is connected to the Internet. Furthermore, the PGW 20 transfers, to the SGW 30, data or a message whose destination is a mobile terminal and that is transmitted by the AP server 1 on the Internet.

The SGW 30 is a relay device that performs routing of user data or the like. For example, the SGW 30 receives, from the base station device 40, various requests or messages transmitted from mobile terminals and then transfers them to the PGW 20 by referring to a routing table. Furthermore, the SGW 30 receives, from the PGW 20, various data or messages transmitted from the AP server 1 and then transfers them to the base station device 40 by referring to the routing table.

The base station device 40 is a device that directly communicates with a mobile terminal. Specifically, the base station device 40 communicates with a mobile terminal present in a cell, i.e., in a communication area, that is managed by the base station device 40. For example, in addition to various controls for performing voice connection between mobile terminals, the base station device 40 controls a download service from the AP server 1 to a mobile terminal.

Specifically, if the base station device 40 receives an acquisition request for data B from the mobile terminal A, the base station device 40 transmits the data B, which is provided from the AP server 1, to the mobile terminal A by using a channel 1. While the base station device 40 is in the process of transmitting the data B to the mobile terminal A, if the base station device 40 receives an acquisition request for the data B from the mobile terminal C, the base station device 40 transmits, to both the mobile terminal A and the mobile terminal C by using the channel 1, pieces of data that are from among the data B and that have not been transmitted to the mobile terminal A. Then, the base station device 40 transmits, to the mobile terminal C by using a channel 2, pieces of data that are from among the data B and that have already transmitted to the mobile terminal A.

As described above, when the base station device 40 is in the process of transmitting data to a first terminal, if the base station device 40 transmits the same data to a second terminal, the base station device 40 transmits data that is to be transmitted to both terminals by using one channel and transmits data that is only to be transmitted to the second terminal by using another channel. Consequently, when compared with the related case in which transmission is performed by using two channels, in the first embodiment, because the number of channels to be used can be reduced to 1 or more and less than 2, when multiple terminals download data, the resource usage can be reduced.

[Processing Sequence]

Figure 2:
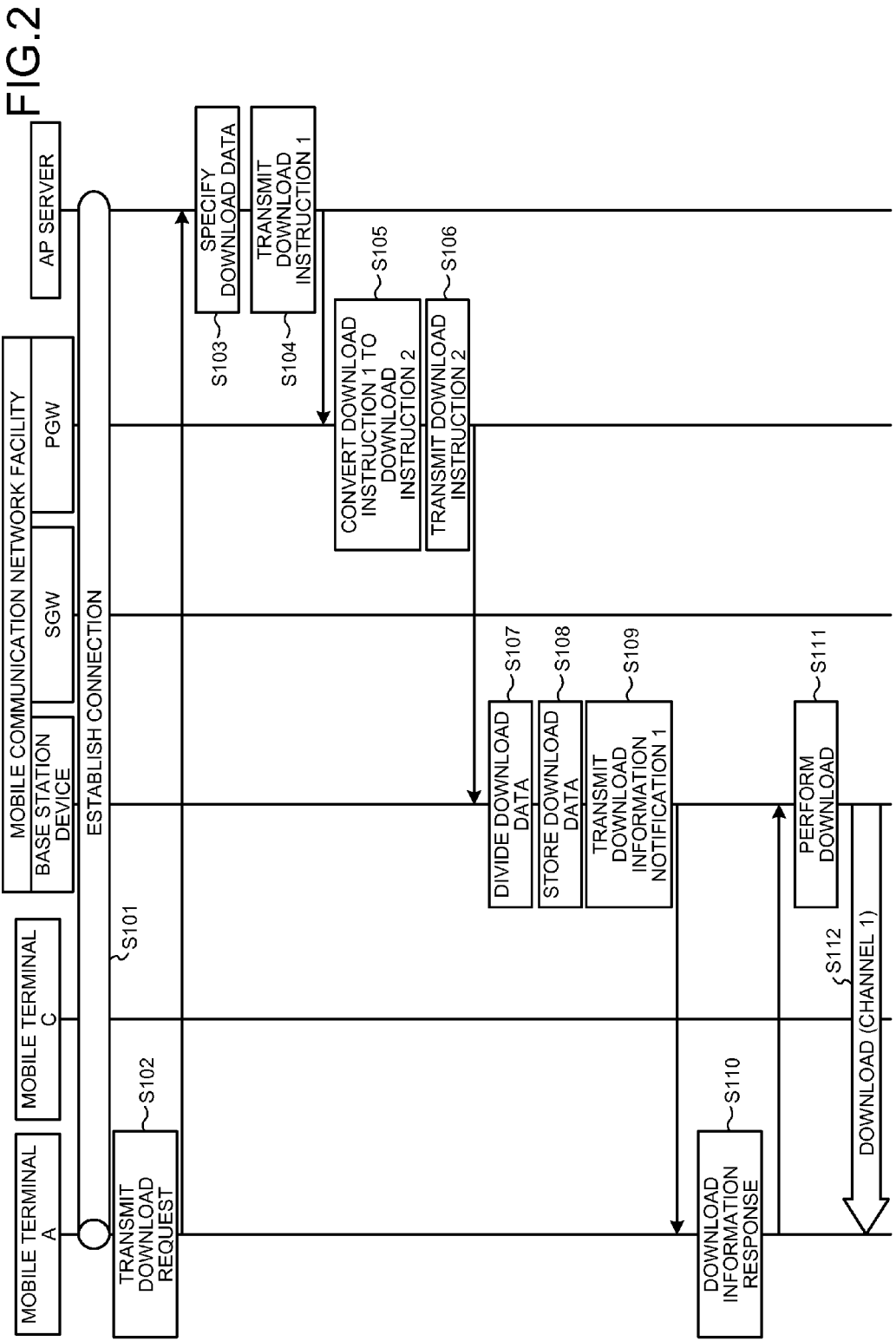
FIG. 2 is a sequence diagram illustrating the flow of a process performed in the system according to the first embodiment.
Figure 3:
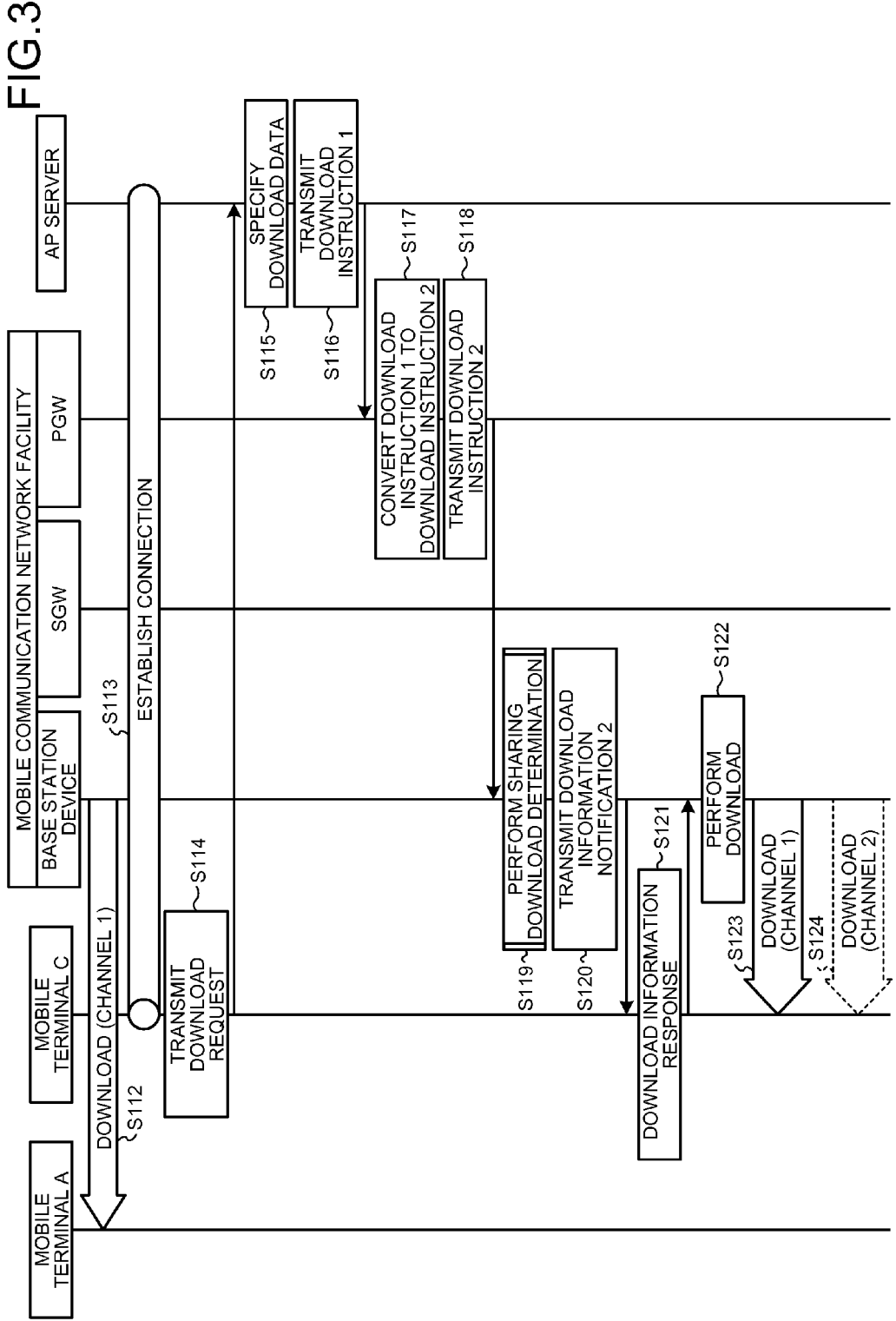
FIG. 3 is a sequence diagram illustrating the flow of a process performed in the system according to the first embodiment.

In the following, a processing sequence performed by the system according to the first embodiment will be described with reference FIGS. 2 and 3. FIGS. 2 and 3 are sequence diagrams each illustrating the flow of a process performed in the system according to the first embodiment.

As illustrated in FIG. 2, the mobile terminal A boots up a Web screen or the like due to the operation performed by a user, accesses the AP server 1, and establishes a connection with the AP server 1 (Step S101). Before the connection is established, a signaling is performed between the mobile terminal A and the mobile communication network facility 10 triggered when a call out is performed by the mobile terminal A. The base station device 40 or the like creates a TEID that is used to identify the mobile terminal A.

If the mobile terminal A receives, on the Web screen that is received from the AP server 1, the operation performed by the user indicating the start of a download, the mobile terminal A transmits a download request to the AP server 1 (Step S102). The AP server 1 receives the download request, specifies download data that is associated with the received request (Step S103), and transmits a "download instruction 1" to the PGW 20 (Step S104). When the AP server 1 establishes the connection with the mobile terminal A, the AP server 1 establishes, with the PGW 20 in the wireless communication network, a communication path by using both IP addresses.

Figure 4:
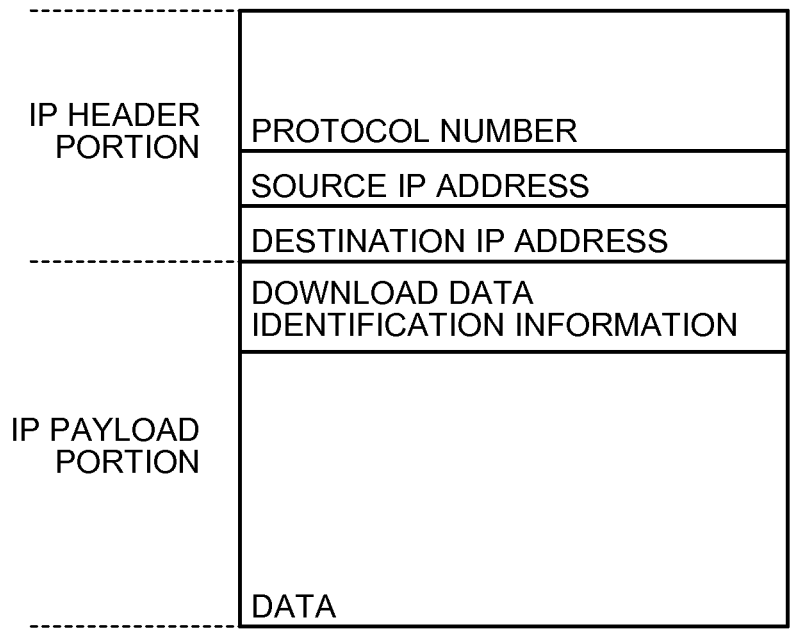
FIG. 4 is a schematic diagram illustrating an example of a download instruction 1.

In the following, a description will be given of an example of a message of the "download instruction 1" that is transmitted by the AP server 1 to the PGW 20. FIG. 4 is a schematic diagram illustrating an example of a download instruction 1. As illustrated in FIG. 4, the "download instruction 1" includes an "Internet Protocol (IP) header portion" and an "IP payload portion". For example, the "IP header portion" includes a "protocol number", a "Source IP address", and a "Destination IP address". The "protocol number" mentioned here is the protocol number for the download instruction 1 exchanged between the AP server 1 and the PGW 20 and stores therein, for example, 150. The "Source IP address" mentioned here is information indicating the transmission source of the download instruction 1 and stores therein, for example, the IP address of the AP server 1. The "Destination IP address" mentioned here is information indicating the destination of the download instruction 1 and stores therein, for example, the IP address of the PGW 20.

The "IP payload portion" includes "download data identification information" and "data". The "download data identification information" mentioned here is information that is used to specify content of download data and stores therein, for example, a uniform resource locator (URL). The "data" mentioned here is data itself to be downloaded and stores therein, in the example described the above, the data B.

A description will be given here by referring back to FIG. 2. The PGW 20 that received the download instruction 1 converts the download instruction 1 to a "download instruction 2" (Step S105) and then transmits the "download instruction 2" to the base station device 40 via the SGW 30 (Step S106). Specifically, the PGW 20 uses an existing GTP-u connection for the mobile terminal A, stores the download data in the "download instruction 2", and then transmits the data to the base station device 40.

Figure 5:
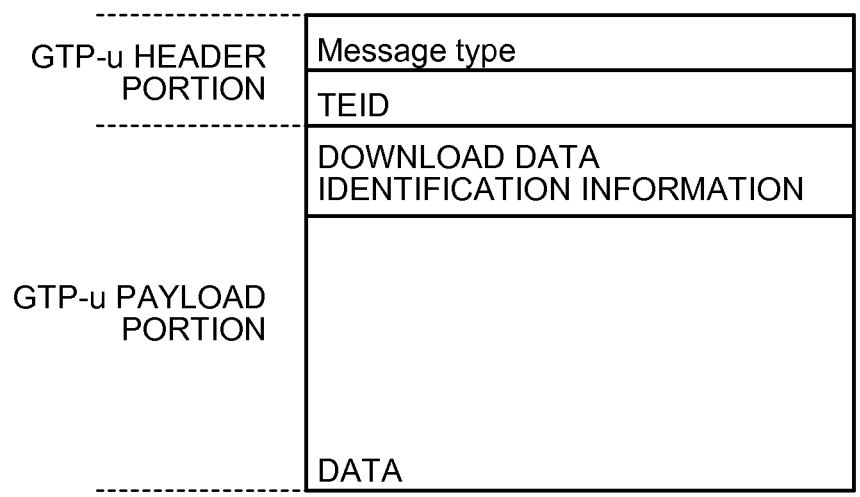
FIG. 5 is a schematic diagram illustrating an example of a download instruction 2.

In the following, a description will be given of an example of a message of the "download instruction 2" that is transmitted by the PGW 20 to the base station device 40. For example, for the "download instruction 2", it is possible to use a method for extending a General Packet Radio Service Tunneling Protocol for User Plane (GTP-u) protocol. FIG. 5 is a schematic diagram illustrating an example of a download instruction 2. As illustrated in FIG. 5, the "download instruction 2" includes a "GTP-u header portion" and a "GTP-u payload portion".

The "GTP-u header portion" includes a "message type" and a "Tunnel Endpoint ID (TEID)". This "message type" is an identifier indicating the download instruction 2 and stores therein a new Type. The "TEID" is an identifier that is used to identify the mobile terminal A and that is created when the signaling is performed between the mobile terminal A and the mobile communication network facility 10. The "GTP-u payload portion" includes "download data identification information" and "data". The "download data identification information" mentioned here is information that is used to specify content of the download data and stores therein, for example, an URL. The "data" mentioned here is data itself to be downloaded and stores therein, in the example described the above, the data B.

A description will be given here by referring back to FIG. 2. The base station device 40 extracts download data from the "GTP-u payload portion" in the download instruction 2 that is received from the PGW 20 and divides the extracted download data into pieces of data with a predetermined size (Step S107). Then, the base station device 40 stores the divided pieces of download data in a memory or the like (Step S108).

Then, the base station device 40 reserves the wireless resource that is used for transmitting the download data to the mobile terminal A and then transmits, as a "download information notification 1" to the mobile terminal A, the information that is used by the mobile terminal A to receive the download data (Step S109). At this point, by using the Radio Resource Control (RRC) connection established after the signaling is performed between the mobile terminal A and the mobile communication network facility 10, the base station device 40 transmits the "download information notification 1" to the mobile terminal A. In this example, it is assumed that the base station device 40 reserves the channel 1 as the wireless resource.

Figure 6:
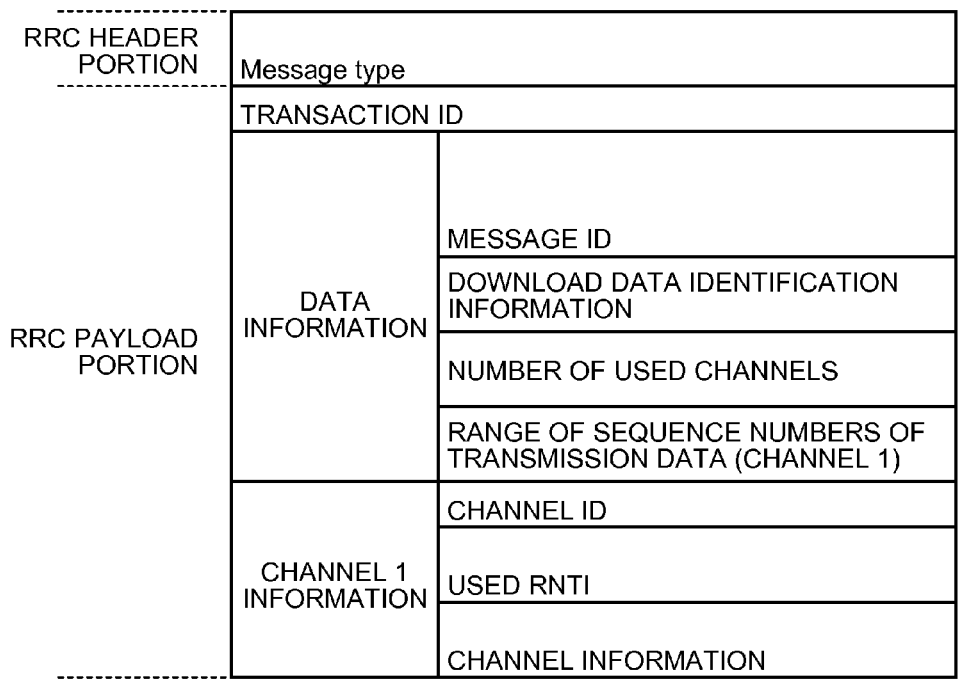
FIG. 6 is a schematic diagram illustrating an example of a download information notification 1.

In the following, a description will be given of an example of a message of a "download information notification 1" that is transmitted by the base station device 40 to the mobile terminal A. For example, for the "download information notification 1", it is possible to use a method for extending an RRC protocol. FIG. 6 is a schematic diagram illustrating an example of a download information notification 1. As illustrated in FIG. 6, the "download information notification 1" includes an "RRC header portion" and an "RRC payload portion". The "RRC header portion" is an identifier that indicates the download information notification 1 and includes a "Message type" in which a new Type is stored.

The "RRC payload portion" includes a "transaction ID", "data information", and "channel 1 information". The "transaction ID" is an identifier for connecting a notification and a response. The "data information" includes a "message ID", "download data identification information", the "number of used channels", and the "range of the sequence numbers of transmission data". The "message ID" is an identifier for identifying download data that is managed and uniquely allocated by the base station device 40. The "download data identification information" is information that specifies the content of download data and stores therein, for example, an URL or the like. The "number of used channels" is the number of channels used for transmitting the download data and stores therein, in this example, "1". The "range of the sequence numbers of transmission data" indicates the sequence numbers that indicates the order of the divided pieces of transmission data.

The "channel 1 information" includes a "channel ID", "used Radio Network Temporary Id (RNTI)", and "channel information". The "channel ID" is an identifier for identifying a channel and stores therein, in this example, "ID=1". The "used RNTI" is an identifier that is allocated to the mobile terminal A by the base station device 40 and stores therein, for example, an identifier for the LTE that is used by the mobile terminal A in order to receive data in the physical layer. The "channel information" stores therein information related to the LTE through which the mobile terminal A receives the channel information.

A description will be given here by referring back to FIG. 2. The mobile terminal A receives the "download information notification 1" message by using an RRC connection, prepares for receiving data in accordance with the received message, and transmits a "download information response" message to the base station device 40 (Step S110). Consequently, the mobile terminal A notifies the base station device 40 that a preparation for data reception has been completed.

Figure 7:
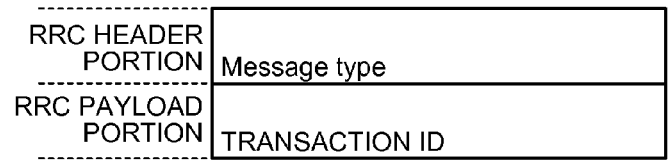
FIG. 7 is a schematic diagram illustrating an example of a download information response.

In the following, a description will be given of an example of a message of a "download information response" transmitted by the mobile terminal A to the base station device 40. For example, a method for extending an RRC protocol can be used for a "download information response". FIG. 7 is a schematic diagram illustrating an example of a download information response. As illustrated in FIG. 7, the "download information response" includes an "RRC header portion" and an "RRC payload portion". The "RRC header portion" is an identifier for indicating a download information response and includes a "Meaasage Type" in which a new Type is stored. The "transaction ID" in the "RRC payload portion" is an identifier for connecting a notification and a response.

A description will be given here by referring back to FIG. 2. The base station device 40 that has received a "download information response" message starts, by using the channel 1, to transmit the download data (data B) to the mobile terminal A (Steps S111 and S112). At this point, the base station device 40 transmits the data B as divided pieces of data.

Subsequently, as illustrated in FIG. 3, while the base station device 40 is in the process of transmitting the divided pieces of download data to the mobile terminal A by using the channel 1, the mobile terminal C accesses, in a similar manner, the AP server 1 and establishes a connection with the AP server (Step S113). Before the connection is established, a signaling is performed between the mobile terminal C and the mobile communication network facility 10 triggered when a call out is performed by the mobile terminal A. The base station device 40 or the like creates an identifier for identifying the mobile terminal A.

If the mobile terminal C receives, on the Web screen received from the AP server 1, the operation performed by the user indicating the start of a download, the mobile terminal C transmits a download request to the AP server 1 (Step S114). The AP server 1 receives the download request, specifies download data that is associated with the received request (Step S115), and transmits the "download instruction 1" to the PGW 20 (Step S116). When the AP server 1 establishes the connection with the mobile terminal C, the AP server 1 establishes, with the PGW 20 in the wireless communication network, a communication path by using both IP addresses.

The PGW 20 that received the download instruction 1 converts the download instruction 1 to the download instruction (Step S117) and transmits the "download instruction 2" to the base station device 40 via the SGW 30 (Step S118). Specifically, the PGW 20 uses an existing GTP-u connection for the mobile terminal C, stores the download data in the "download instruction 2", and then transmits the data to the base station device 40.

The base station device 40 extracts the download data from the download instruction 2 that is received from the PGW 20, specifies that the data is currently being transmitted, and performs a share download determining process that determines whether a share download may be performed (Step S119). The share download determining process will be described later; therefore, a description thereof will be omitted here. Here, it is assumed that it is determined that the share download may be performed.

Thereafter, the base station device 40 reserves the wireless resource used for transmitting the download data to the mobile terminal C and transmits, to the mobile terminal C, the "download information notification 2" as information that is used to receive the download data by the mobile terminal C (Step S120). At this point, by using the RRC connection that is established after the signaling between the mobile terminal C and the mobile communication network facility 10, the base station device 40 transmits the "download information notification 2" to the mobile terminal C. In this example, it is assumed that the base station device 40 newly reserved the channel 2 as the wireless resource.

In the following, a description will be given of an example of a message of a "download information notification 2" that is transmitted by the base station device 40 to the mobile terminal C. For example, a method for extending an RRC protocol may be used for the "download information notification 2". FIG. 8 is a schematic diagram illustrating an example of a download information notification 2. As illustrated in FIG. 8, the "download information notification 2" includes an "RRC header portion" and an "RRC payload portion". The "RRC header portion" is an identifier that indicates the download information notification 2. The "RRC header portion" includes a "Message type" in which a new Type is stored.

The "RRC payload portion" includes a "transaction ID", "data information", "channel 1 information", and "channel 2 information". The "transaction ID" is an identifier for connecting a notification and a response. The "data information" includes a "message ID", "download data identification information", the "number of used channels, the "range of the sequence numbers of transmission data (channel 1)", and the "range of the sequence numbers of transmission data (channel 2)". The "message ID" is an identifier for identifying download data that is managed and is uniquely allocated by the base station device 40. The "download data identification information" is information that specifies the content of download data and stores therein, for example, an URL or the like. The "number of used channels" is the number of channels used for transmitting the download data and stores therein, in this example, "2".

Furthermore, the "range of the sequence numbers of transmission data (channel 1)" indicates the sequence numbers that indicate the order of the divided pieces of transmission data that are transmitted by using the channel 1. In this example, "4 to 9" are specified. The "range of the sequence numbers of transmission data (channel 2)" indicates the sequence numbers that indicate the order of the divided pieces of transmission data that are transmitted by using the channel 2. In this example, "1 to 3" are specified.

Furthermore, the "channel 1 information" includes a "channel ID", a "used RNTI", and "channel information". The "channel ID" is an identifier for identifying a channel and stores therein, in this example, "ID of 1". The "used RNTI" is an identifier allocated by the base station device 40 to the mobile terminal A and stores therein an identifier for the LTE that is used, for example, by the mobile terminal A to receive data in the physical layer. The "channel information" stores therein information related to the LTE through which the mobile terminal A receives the channel information.

Furthermore, the "channel 2 information" includes a "channel ID", a "used RNTI", and "channel information". The "channel ID" is an identifier for identifying a channel and stores therein, in this example, "ID of 2". The "used RNTI" is an identifier allocated by the base station device 40 to the mobile terminal C and stores therein, for example, an identifier for the LTE that is used by the mobile terminal C to receive data by using the physical layer. The "channel information" stores therein information related to the LTE through which the mobile terminal C receives the channel information.

A description will be given here by referring back to FIG. 3. The mobile terminal C receives the "download information notification 2" message by using an RRC connection, prepares for receiving data in accordance with the received message, and transmits a "download information response" message to the base station device 40 (Step S121). Consequently, the mobile terminal C notifies the base station device 40 that a preparation for data reception has been completed.

Thereafter, the base station device 40 that received the "download information response" message transmits, to both the mobile terminal A and the mobile terminal C by using the channel 1, download data that is data that has not yet been transmitted to the mobile terminal A (Steps S122 and S123). In the example of the message described above, the base station device 40 sequentially transmits sequence numbers 4 to 9 of the data B by using the channel 1.

At the same time, the base station device 40 transmits, to the mobile terminal C by using the channel 2, download data that is data that has already been transmitted to the mobile terminal A (Steps S122 and S124). In the example of the message described above, the base station device 40 transmits sequence numbers 1 to 3 of the data B by using the channel 2.

Specifically, on the basis of the channel configuration notified by the "download information notification 1" and the "download information notification 2", the mobile terminal C receives the divided pieces of data with the sequence number from 4 to 9 by using the channel 1. Furthermore, the mobile terminal C receives the divided pieces of data with the sequence number from 1 to 3 by using the channel 2. Then, on the basis of the sequence number attached to each of the divided pieces of data, the mobile terminal C assembles the original data.

Specific Example

Figure 9:
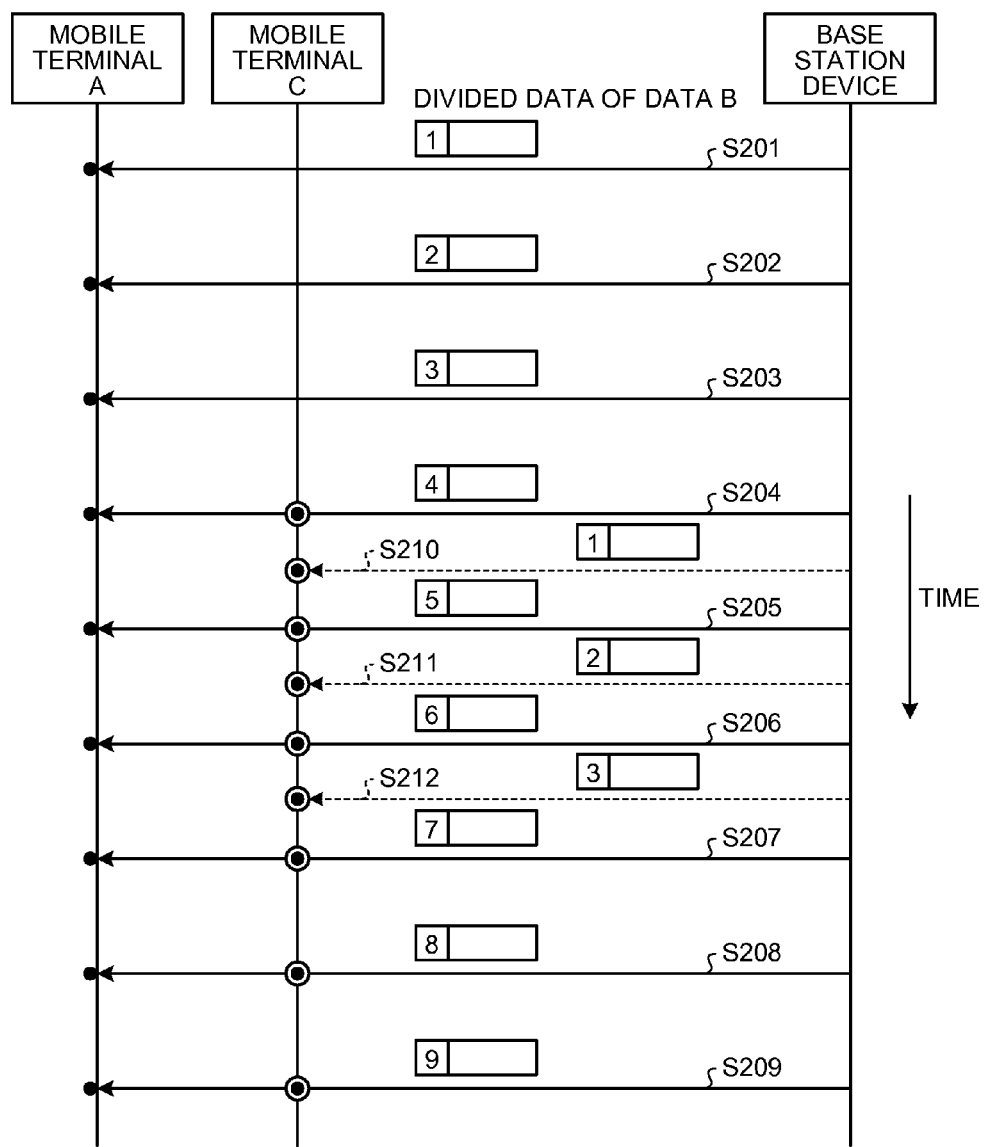
FIG. 9 is a schematic diagram illustrating an example of data transmission performed by a base station device.

In the following, a description will be given of a specific example of each of the data transmission from the base station device 40 to the mobile terminal A and the mobile terminal C described in the above processing sequence. FIG. 9 is a schematic diagram illustrating an example of data transmission performed by a base station device.

As illustrated in FIG. 9, by using the channel 1, the base station device 40 sequentially transmits the divided pieces of data to the mobile terminal A that requested a download first. Specifically, by using the channel 1, the base station device 40 transmits a divided piece of data 1 in the data B (Step S201), transmits a divided piece of data 2 in the data B (Step S202), and then transmits a divided piece of data 3 in the data B (Step S203).

Then, at Steps S204 and S206, the base station device 40 transmits, by using the channel 2 to the mobile terminal C that requested the download, the divided pieces of data that have already been transmitted to the mobile terminal A. Furthermore, the base station device 40 transmits, by using the channel 1 that is the same channel as that used for the mobile terminal A, the divided pieces of data that will be transmitted from now to the mobile terminal A.

Specifically, the base station device 40 sequentially transmits, to both the mobile terminal A and the mobile terminal C by using the channel 1, a divided piece of data 4 in the data B (Step S204), a divided piece of data 5 in the data B (Step S205), and a divided piece of data 6 in the data B (Step S206).

Furthermore, the base station device 40 sequentially transmits, to both the mobile terminal A and the mobile terminal C by using the channel 1, a divided piece of data 7 in the data B (Step S207), a divided piece of data 8 in the data B (Step S208), and a divided piece of data 9 in the data B (Step S209).

Furthermore, at the same time as the processes at Steps S204 to S206, the base station device 40 sequentially transmits, to the mobile terminal C by using the channel 2, the divided piece of data 1 in the data B (Step S210), divided piece of data 2 in the data B (Step S211), and the divided piece of data 3 in the data B (Step S212).

[Advantage of the First Embodiment]

With the related technology, if the amount of wireless resource needed for downloading a piece of data to a single mobile terminal is defined as "1" and if this data is downloaded to two terminals at the same time, wireless resource of "2" is used in a general structure. In contrast, if the base station device according to the first embodiment, the resource usage can be reduced to "1 or more and less than 2".

Furthermore, the structure used in the first embodiment may also be used for the same operation of three terminals or more. In such a case, in an environment in which a lot of terminals download the same data during, in particular, commuting hours in the morning and evening, the wireless resource usage can be significantly saved when compared with a case in which a usual download method is used.

[b] Second Embodiment

In a second embodiment, a specific description will be given of the configuration of each device described in the first embodiment. The AP server 1 has the same function as that performed by a typically used application server. Furthermore, the SGW 30 has the same function as that performed by a typical SGW; therefore, descriptions thereof in detail will be omitted.

Furthermore, the PGW 20 also has the same function as that performed by a typical PGW except for the conversion from the download instruction 1 to the download instruction 2 described in the first embodiment; therefore, a description thereof in detail will be omitted. In the following, a description will be given of the relationship between the base station device 40 and the mobile terminal A or the mobile terminal C. Furthermore, the mobile terminal A and the mobile terminal C have the same configuration; therefore, in the second embodiment, a mobile terminal 50 is used for a description thereof.

Furthermore, in the second embodiment, a description will be given of a case, as an example, in which each of the mobile terminals is connected to the base station device by using an RRC connection and each of the devices in the mobile communication network facility 10 is connected by using a GTP-u connection.

[Configuration of the Base Station Device]

Figure 10:
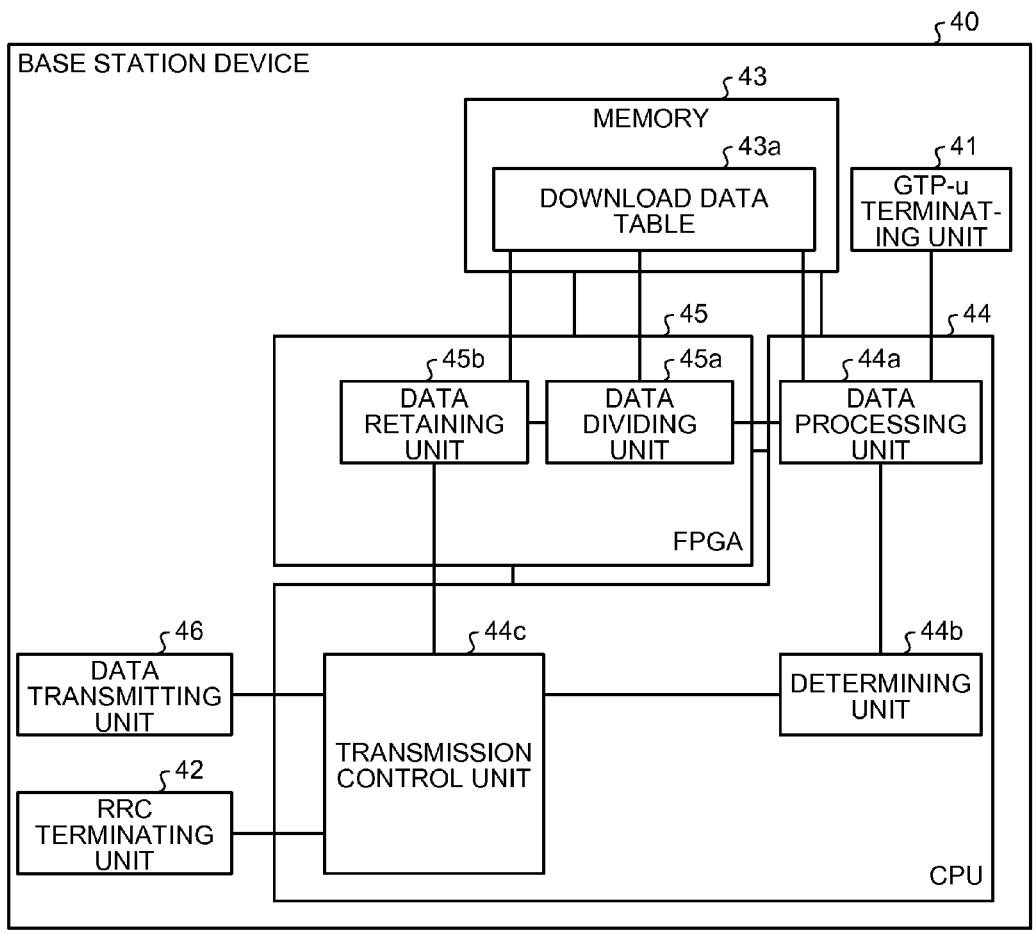
FIG. 10 is a block diagram illustrating the configuration of the base station device.

FIG. 10 is a block diagram illustrating the configuration of the base station device. As illustrated in FIG. 10, the base station device 40 includes a GTP-u terminating unit 41, an RRC terminating unit 42, a memory 43, a central processing unit (CPU) 44, a field-programmable gate array (FPGA) 45, and a data transmitting unit 46. The CPU and the FPGA are only examples and the hardware is not limited thereto. For example, all of these may also be implemented by CPUs.

The GTP-u terminating unit 41 is an interface that terminates the GTP-u connection established between the PGW 20 and the SGW 30 and that exchanges various messages or the like with the PGW 20. For example, the GTP-u terminating unit 41 receives the "download instruction 2" that is transmitted from the PGW 20 by using the GTP-u connection. Then, the GTP-u terminating unit 41 outputs the TEID of the GTP-u that is an identifier of the connection that has received the "download instruction 2" and outputs information or the like stored in the "download instruction 2" to a data processing unit 44a. Furthermore, the GTP-u terminating unit 41 transfers the download request transmitted from the mobile terminal A to the SGW 30.

The RRC terminating unit 42 is an interface that terminates the RRC connection established between the mobile terminal A and the mobile terminal C and that exchanges various messages or the like with each of the mobile terminals. For example, the RRC terminating unit 42 transmits the "download information notification 1" to the mobile terminal A and receives a "download information response" from the mobile terminal A. Furthermore, the RRC terminating unit 42 transmits the "download information notification 2" to the mobile terminal C and receives a "download information response" from the mobile terminal C. Furthermore, the RRC terminating unit 42 receives a download request from the mobile terminal A or the mobile terminal C.

The memory 43 is a storage device that stores therein programs executed by the base station device 40 or download data and that includes a download data table 43a. The download data table 43a stores therein information related to download data that is extracted from the "download instruction 2" by the base station device 40. FIG. 11 is a schematic diagram illustrating an example of information stored in a download data table. As illustrated in FIG. 11, the download data table 43a stores therein, in an associated manner, "AP server-side information", "terminal-side information", and "memory information".

The "AP server-side information" stores therein "download data identification information" as information on the AP server indicating an URL or the like of download data. The "terminal-side information" indicates information on the mobile terminal side and includes a "message ID" that identifies download data and a "divided count" that indicates the number of divided pieces of download data. The "memory information" indicates information on a memory and includes a "data store address" that indicates the location in which download data is stored and the "size" that indicates an amount of download data.

The first line in FIG. 11 indicates that the base station device 40 allocates "message ID of 1" to the download data that is present at the URL of "http://www.xxx.co.jp/aaa/ggg"; divides the download data into "1520" pieces. Then, the base station device 40 stores the download data with the "size" of "xxx" in the address at "8000 0000" in the memory.

The CPU 44 is a processing unit that controls the entire network or calls between each of the devices, such as connecting a packet call and reserving a data transmission line. The CPU 44 includes the data processing unit 44a, a determining unit 44b, and a transmission control unit 44c. The CPU 44 is a control processing unit that controls the so-called C-plane.

The data processing unit 44a specifies a target mobile terminal from a connection identifier and determines whether the data included in the received "download instruction 2" is registered in the memory 43. For example, the data processing unit 44a extracts download data identification information from the "download instruction 2" and searches the download data table 43a by using the download data identification information as a key.

If the download data identification information is not stored in the download data table 43a, the data processing unit 44a stores the download data in the memory 43. Then, the data processing unit 44a attaches a message ID that is unique to the download data and creates a record in the download data table 43a. Then, the data processing unit 44a stores, in the created record, the download data identification information, the size, data store address, and the like. Then, the data processing unit 44a outputs the download data to a data dividing unit 45a.

In contrast, if the download data identification information is stored in the download data table 43a, the data processing unit 44a acquires a target piece of data of the download data from the download data table 43a and outputs the data to a data retaining unit 45b. Furthermore, the data processing unit 44a outputs the terminal-side information or the like stored in the download data table 43a to the determining unit 44b.

The determining unit 44b performs a share download determining process that determines whether multiple terminals are allowed to perform a download by using a shared channel at the same time. Then, the determining unit 44b outputs the determination result to the transmission control unit 44c. For example, the determining unit 44b calculates the number of pieces of un-transmitted data from both the divided count, which is acquired from the data processing unit 44a, and the number of pieces of transmitted data, which is acquired from the transmission control unit 44c. If the calculated number of pieces of un-transmitted data is equal to or greater than the threshold, the data processing unit 44a determines that the download can be shared and outputs the determination result to the transmission control unit 44c.

For another example, it is assumed that the size of download data before the data is divided is defined as A, the number of divided pieces of data that have already transmitted to the mobile terminal A is defined as B, the size of a piece of the "divided data" is defined as C, and the size of a download information notification message is defined as D. Furthermore, it is assumed that, if data is downloaded in a shared manner, an increasing rate of the amount of transmission data in a physical layer with respect to the amount of transmission data performed by using a usual transmission method is defined as E. A and B can be acquired from the download data table 43a and C can be acquired from the size and the "divided count" in the download data table 43a. Furthermore, D and E can be measured and be set in advance.

In such a case, the determining unit 44b determines whether the total amount of transmission data "A", which is obtained when the data is transmitted to the mobile terminal C by using a usual transmission method, is greater than the total amount of transmission data "(B×C+D)×(1+E)", which is obtained when the data is simultaneously downloaded to both the mobile terminal C and the mobile terminal A.

For example, it is assumed that A is 9000 bytes (72000 bits), B is 33 pieces (total divided counts=36 pieces), C is 252 bytes (an example of 250 bytes data+2 bytes identifier), D is 120 bytes, and E is 5%. In such a case, because "A" is 72000 and "(B×C+D)×(1+E)" corresponds to "(33×252×8+120×8)×(1+0.05)=70862.4", the determining unit 44b determines that a share download can be performed.

A description will be given here by referring back to FIG. 10. The transmission control unit 44c reserves the wireless resource, creates the "download information notification 1" or the "download information notification 2", and transmits them to both the mobile terminals. For example, if the transmission control unit 44c receives a notification from the determining unit 44b indicating that the share download is not able to be performed, the transmission control unit 44c reserves a new channel in the data transmitting unit 46. Then, the transmission control unit 44c creates the "download information notification 1" and transmits the created notification to the mobile terminal A via the RRC terminating unit 42. Furthermore, if the transmission control unit 44c receives a "download information response" from the mobile terminal A via the RRC terminating unit 42, the transmission control unit 44c starts to transmit the divided pieces of data that are acquired from the data retaining unit 45b.

In contrast, if the transmission control unit 44c receives a notification from the determining unit 44b indicating that the share download can be performed, the transmission control unit 44c reserves, in the data transmitting unit 46, another channel that is other than the currently used channel. Then, the transmission control unit 44c creates the "download information notification 2" and transmits the created notification to the mobile terminal C via the RRC terminating unit 42. Furthermore, if the transmission control unit 44c receives a "download information response" from the mobile terminal C via the RRC terminating unit 42, the transmission control unit 44c starts to transmit the divided pieces of data that are acquired from the data retaining unit 45b. Specifically, for the divided pieces of data that have not been transmitted to the mobile terminal A, the transmission control unit 44c controls such that the un-transmitted data is transmitted to both the mobile terminal A and the mobile terminal C by using the channel 1. Furthermore, for the divided pieces of data that have already been transmitted to the mobile terminal A, the transmission control unit 44c controls such that the transmitted data is transmitted to the mobile terminal C by using the channel 2.

The FPGA 45 is a processing unit that has a baseband processing function or the like and that controls an exchange of user data between end-to-end. The FPGA 45 includes the data dividing unit 45a and the data retaining unit 45b. The FPGA 45 controls the so-called U-plane.

The data dividing unit 45a divides download data acquired from the data processing unit 44a and then stores the data in the download data table 43a in the memory 43. For example, the data dividing unit 45a divides the download data into a predetermined size, stores the divided pieces of download data in the download data table 43a, and outputs the data to the data retaining unit 45b. The data retaining unit 45b is a buffer or the like that temporarily stores the download data that is currently targeted for transmission to the mobile terminal.

The data transmitting unit 46 transmits, to each mobile terminal, data conforming to the control performed by the transmission control unit 44c. For example, if the data transmitting unit 46 receives the divided data that has been read by the transmission control unit 44c from the data retaining unit 45b, the destination of the divided data, a channel ID, or the like from the data retaining unit 45b, the data transmitting unit 46 transmits the data by using the specified channel. At this point, the divided data transmitted by the data transmitting unit 46 is constituted by a "sequence number" and "data".

In the example described above, first, the data transmitting unit 46 transmits the divided pieces of data to the mobile terminal A by using the channel 1. Then, if the determining unit 44b determines that the data can be downloaded by using the share download process, the data transmitting unit 46 transmits, both the mobile terminal A and the mobile terminal C by using the channel 1, the divided pieces of data that have not been transmitted and then transmits, to the mobile terminal C by using the channel 2, the divided pieces of data that have already been transmitted to the mobile terminal A.

[Configuration of the Mobile Terminal]

Figure 12:
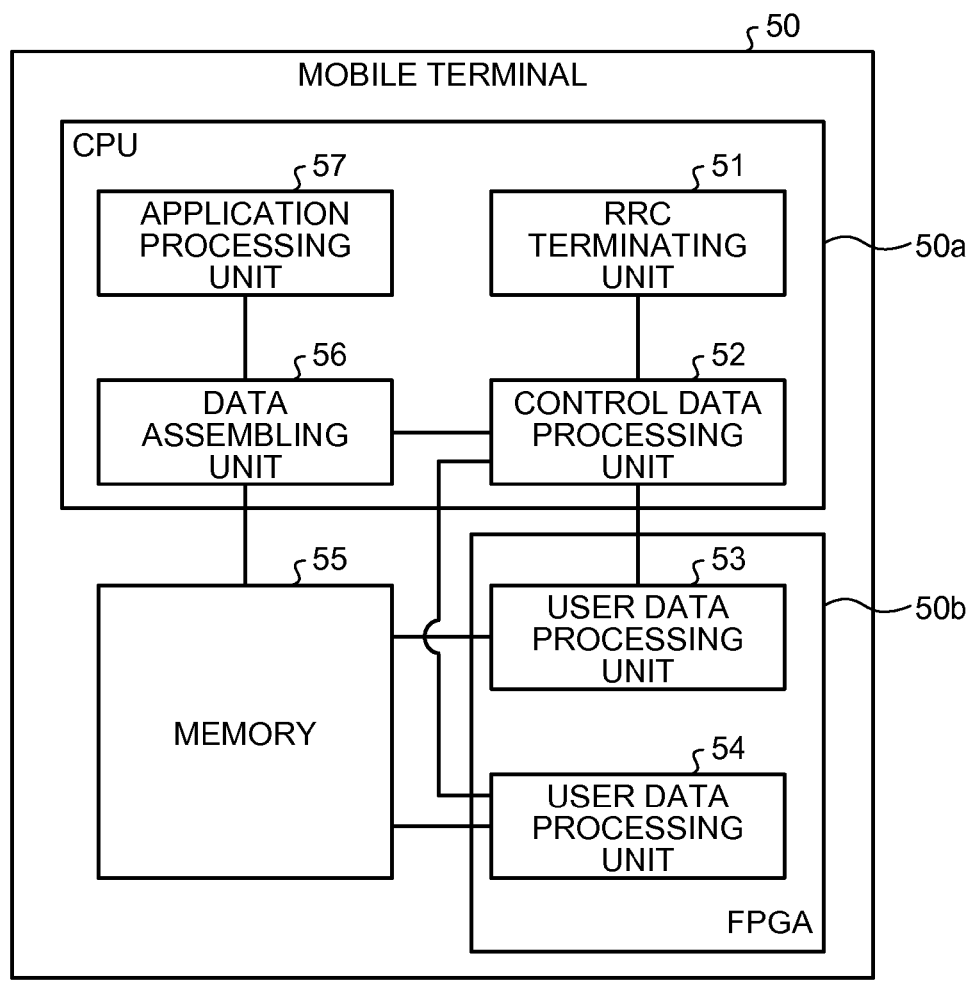
FIG. 12 is a block diagram illustrating the configuration of a mobile terminal.

FIG. 12 is a block diagram illustrating the configuration of a mobile terminal. As illustrated in FIG. 12, the mobile terminal 50 includes a CPU 50a, an FPGA 50b, and a memory 55. The CPU and the FPGA are only examples and the hardware is not limited thereto.

The CPU 50a includes an RRC terminating unit 51, a control data processing unit 52, a data assembling unit 56, and an application processing unit 57. The FPGA 50b has a baseband processing function of the like and includes a user data processing unit 53 and a user data processing unit 54. Here, the processing unit used for a download is illustrated; however, the configuration of the mobile terminal is not limited thereto. The mobile terminal may also have a function, such as a usual wireless communication function, a sound call function, an image processing function, and the like.

The RRC terminating unit 51 is an interface that terminates the RRC connection that is established with the base station device 40 and that exchanges various messages with the base station device 40. For example, the RRC terminating unit 51 receives a download information notification from the base station device 40 and outputs the notification to the control data processing unit 52. Furthermore, the RRC terminating unit 51 transmits, to the base station device 40, the download information response that is output from the control data processing unit 52.

The control data processing unit 52 is a processing unit that controls the entire network or calls, such as an instruction to receive data, between the devices, and that controls the so-called C-plane. For example, the control data processing unit 52 specifies the number of channels for receiving data on the basis of the data information or the channel information in the download information notification acquired from the RRC terminating unit 51. Then, the control data processing unit 52 boots up the user data processing units the number of which corresponds to the number of specified channels. For example, the control data processing unit 52 instructs the user data processing unit 53 to receive data by using the channel 1 and instructs the user data processing unit 54 to receive data by using the channel 2.

The user data processing unit 53 and the user data processing unit 54 are processing units that control an exchange of user data and that controls the so-called U-plane. For example, if the user data processing unit 53 receives, from the control data processing unit 52, an instruction to receive divided pieces of data by using the channel 1, the user data processing unit 53 receives the divided pieces of data that have been transmitted from the base station device 40 by using the channel 1 and writs the received data into the memory 55. Furthermore, if the user data processing unit 54 receives, from the control data processing unit 52, an instruction to receive divided pieces of data by using the channel 2, the user data processing unit 54 receives the divided pieces of data that have been transmitted from the base station device 40 by using the channel 2 and writes the received data into the memory 55.

The memory 55 stores therein divided pieces of data that have been received by the user data processing unit 53 or the user data processing unit 54. For example, the memory 55 stores therein divided pieces of data in which a "sequence number" and "data content" is stored.

The data assembling unit 56 binds the divided pieces of data stored in the memory 55 in the order of the "sequence numbers" and creates the original download data. Then, the data assembling unit 56 outputs the created download data and the download data identification information to the application processing unit 57.

The application processing unit 57 executes an application by using both the download data and the download data identification information acquired from the data assembling unit 56. For example, if the download data is video image data, the application processing unit 57 plays back the video image data and, if the download data is image data, the application processing unit 57 displays the image data on a display or the like.

[Flow of a Process]

Figure 13:
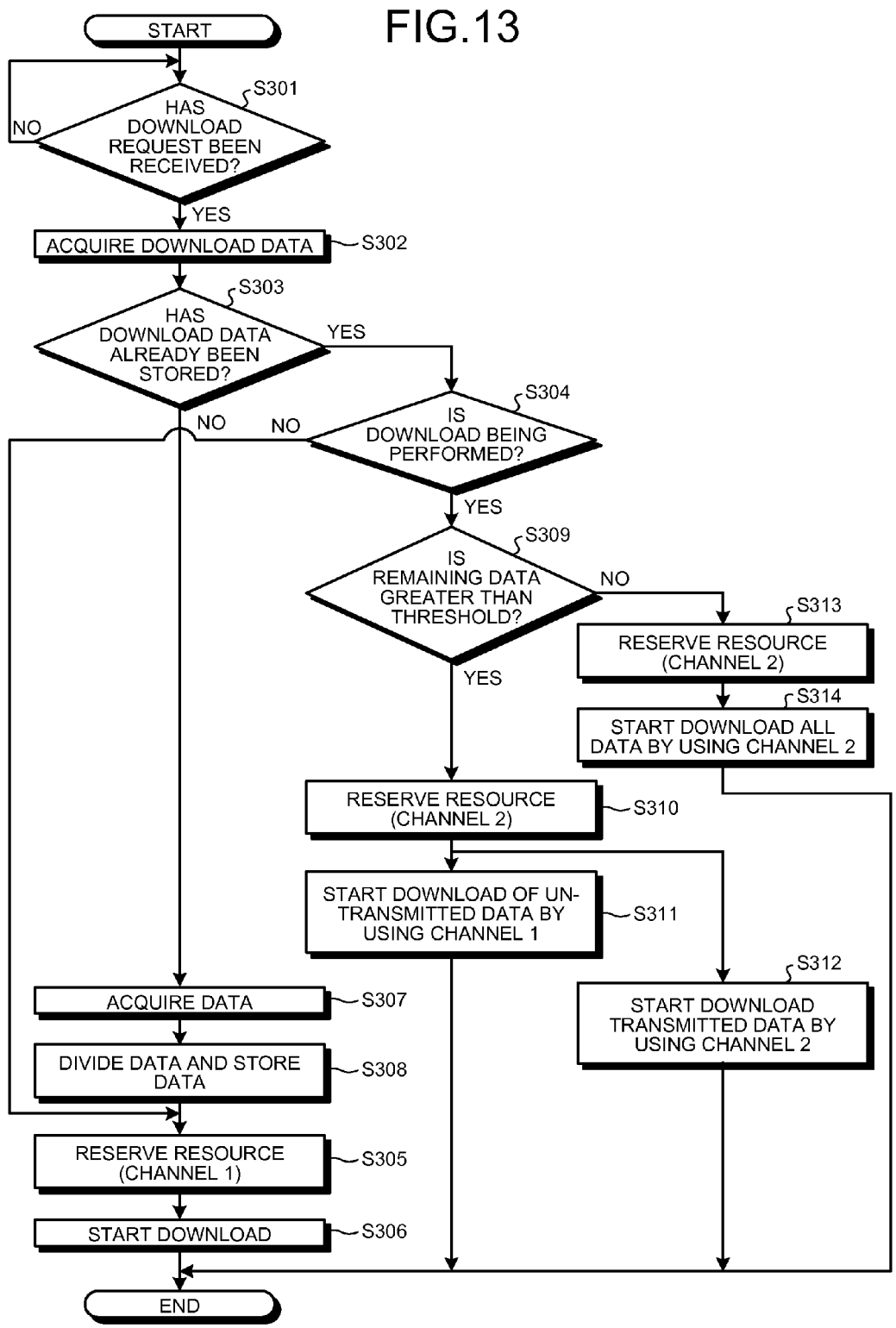
FIG. 13 is a flowchart illustrating the flow of a process performed by the base station device.

FIG. 13 is a flowchart illustrating the flow of a process performed by the base station device. As illustrated in FIG. 13, if the RRC terminating unit 42 in the base station device 40 receives a download request (Yes at Step S301), the data processing unit 44a acquires the download instruction 2, i.e., download data from the AP server 1 via the GTP-u terminating unit 41 (Step S302).

Subsequently, the data processing unit 44a searches the download data table 43a by using, as a key, download data identification information included in the download instruction 2 and determines whether the download data has already been stored in the download data table 43a (Step S303).

If it is determined that the download data has been stored (Yes at Step S303), the data processing unit 44a refers to the data retaining unit 45b on the basis of the download data identification information in the download instruction 2 and determines whether the download data is being downloaded (Step S304).

If it is determined that the download data is not being downloaded (No at Step S304), the transmission control unit 44c reserves the channel 1 that is used to transmit the download data (Step S305). At this point, the download data identification information is output from the data processing unit 44a to the FPGA 45. The FPGA 45 obtains data that is associated with the download data identification information from the download data table 43a and then stores the data in the data retaining unit 45b.

Then, the transmission control unit 44c outputs, to the data transmitting unit 46 by using the channel 1, an instruction to start data transmission. The data transmitting unit 46 transmits, to a mobile terminal by using the channel 1, divided pieces of data read by the transmission control unit 44c from the data retaining unit 45b (Step S306).

In contrast, if it is determined that the download data has not been stored (No at Step S303), the data processing unit 44a acquires the download data in accordance with the download data identification information in the download instruction 2 (Step S307). Subsequently, the data dividing unit 45a divides the acquired download data into pieces of data with a predetermined size and stores the data in both the memory 43 and the data retaining unit 45b together with the download data identification information (Step S308). At this point, the data dividing unit 45a creates, in the download data table 43a, a record that indicates the information stored in the memory 43. Thereafter, the process at Step S305 and the subsequent processes are performed.

In contrast, if the data processing unit 44a determines that the download data is being downloaded (Yes at Step S304), the determining unit 44b determines whether the share download process that performs a download by using a shared channel can be performed (Step S309). For example, the determining unit 44b determines whether the amount of data that has not been transmitted is equal to or greater than a threshold.

If the determining unit 44b determines that the share download process can be performed (Yes at Step S309), the transmission control unit 44c reserves, as a new channel, the channel 2 in the data transmitting unit 46 (Step S310). Then, by using the channel 1, the data transmitting unit 46 transmits, to both a terminal that started to download the data first and a terminal that requested a download of the data later, divided pieces of data that have been read from the data retaining unit 45b by the transmission control unit 44c and that have not been transmitted (Step S311). At the same time, by using the channel 2, the data transmitting unit 46 transmits, to the terminal that requested the download of the data later, divided pieces of data that have been read from the data retaining unit 45b by the transmission control unit 44c and that have already been transmitted to the terminal that started to download the data first (Step S312).

In contrast, if the determining unit 44b determines that the share download process is not able to be performed (No at Step S309), the transmission control unit 44c reserves, as a new channel, the channel 2 in the data transmitting unit 46 (Step S313). Then, by using the channel 2, the data transmitting unit 46 sequentially transmits, to the terminal that requested the download of the data later, the divided pieces of data read by the transmission control unit 44c from the data retaining unit 45b in the order of the sequence numbers (Step S314).

[Advantage of the Second Embodiment]

According to the second embodiment, while the base station device 40 is in the process of transmitting data to a first terminal, if the base station device 40 transmits the same data to a second terminal, the base station device 40 can determine which method can be reduced the resource, i.e., a method that transmits the data by using a shared channel or a method that transmits the data by using separate channels. Consequently, because appropriate determination can be performed in accordance with the state of download data, such as the amount of download data or un-transmitted data, if multiple terminals download data, it is possible to select a method that can further reduce the resource usage.

[c] Third Embodiment

In the following, a description will be given of a process performed when streaming data is used. Streaming data can be sequentially played back by using an application without waiting for the all the pieces of data being received. Even if such streaming data is used, it is possible to use the same method as that used in the first embodiment or the second embodiment.

Figure 14:
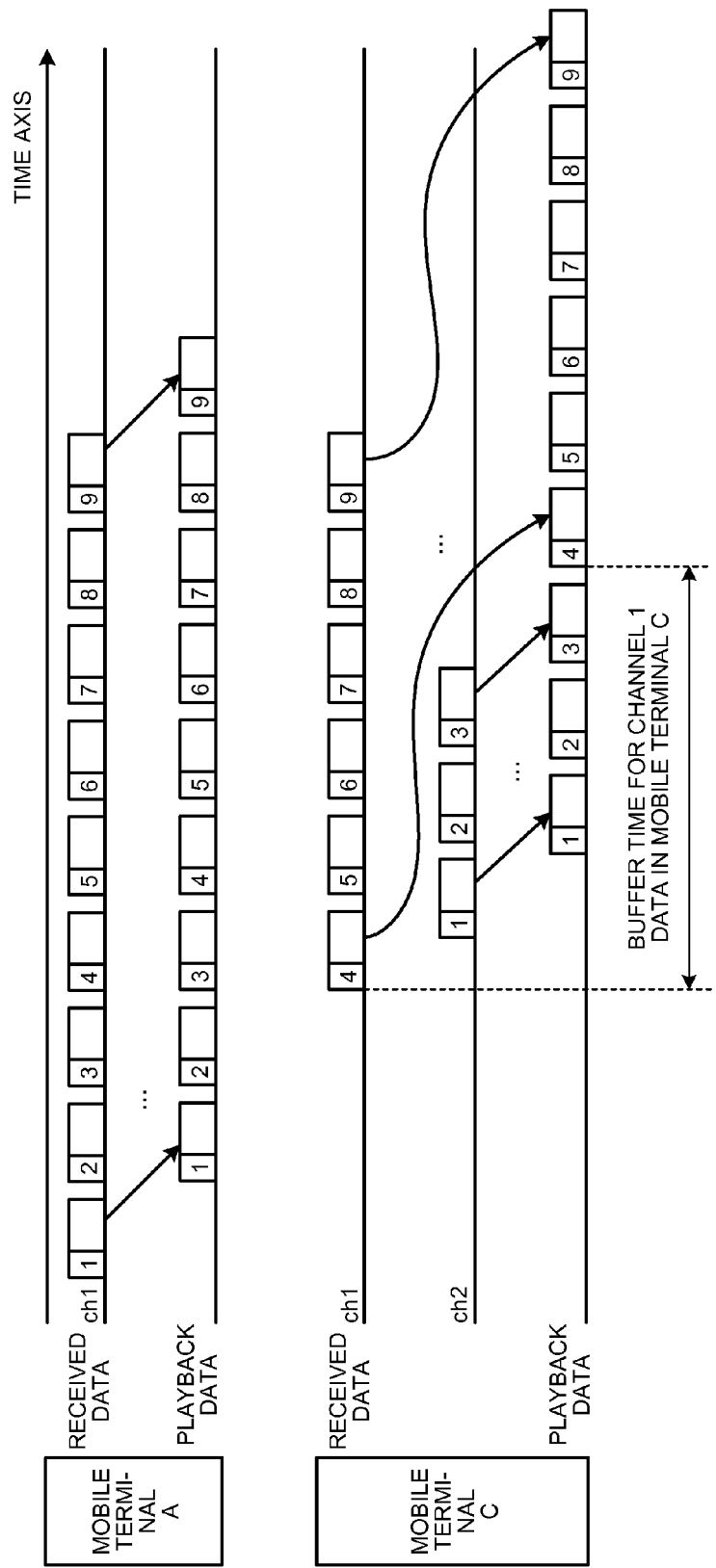
FIG. 14 is a schematic diagram illustrating a case in which streaming data is transmitted by using a share download method.

FIG. 14 is a schematic diagram illustrating a case in which streaming data is transmitted by using a share download method. As illustrated in FIG. 14, because the mobile terminal A sequentially receives divided pieces of data starting from the sequence number 1 using the channel 1, the divided pieces of data can be sequentially played back.

The mobile terminal C receives the divided pieces of data starting from the sequence number 4 by using the channel 1 that is shared with the mobile terminal A, whereas the mobile terminal C receives divided pieces of data with the sequence numbers 1 to 3, which have already been transmitted to the mobile terminal A, by using the channel 2. Consequently, the mobile terminal C receives first the divided pieces of data starting from the sequence number 4 before the mobile terminal C receives the divided pieces of data with the sequence numbers 1 to 3.

Accordingly, if the mobile terminal C receives the divided pieces of data starting from the sequence number 4, the mobile terminal C temporarily stores the data in a buffer until the mobile terminal C receives the divided pieces of data with the sequence numbers 1 to 3. If the mobile terminal C completes the receiving of divided pieces of data with the sequence numbers 1 to 3, the mobile terminal C plays back the divided pieces of data starting from the sequence number 1.

As described above, because the mobile terminal C uses the buffer, even if streaming data is used, it is possible to transmit download data to each mobile terminal by using the same method as that used in the first embodiment or the second embodiment.

[d] Fourth Embodiment

For example, in the "download instruction 2" message described in the first and the second embodiments, even if data is already stored in the base station device 40, the same data is stored in the message and then transmitted from the PGW 20 to the base station device 40. Consequently, it is hard to say that the band usage rate in the mobile communication network facility 10 is efficiently used.

Figures 15, 16:
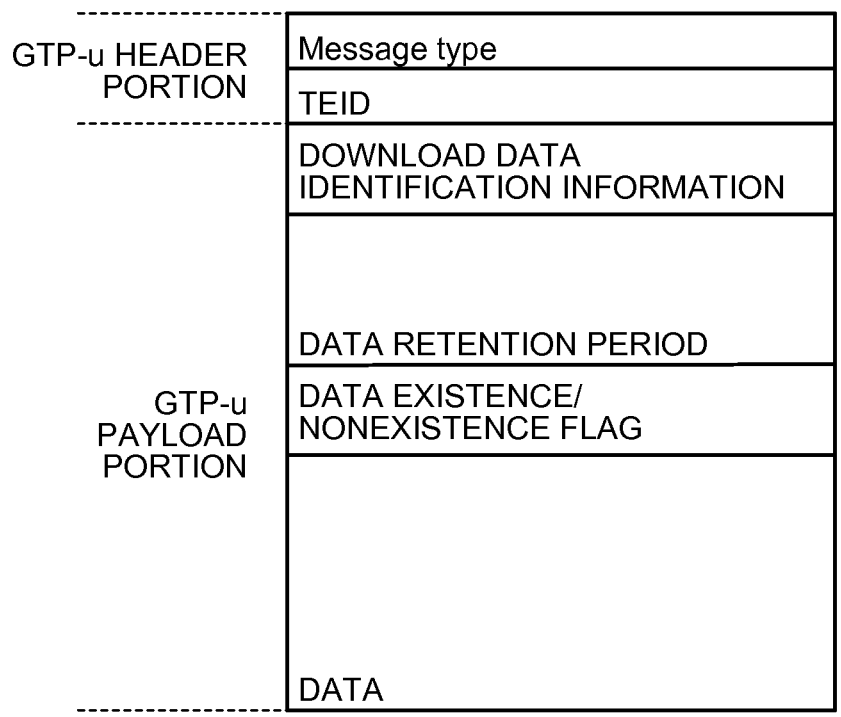
FIG. 15 is a schematic diagram illustrating an example of a download instruction 2 according to a fourth embodiment.
FIG. 16 is a schematic diagram illustrating an example of managing download data by using the elapsed time.

Accordingly, in a fourth embodiment, a description will be given of an example of improving the band usage rate in the mobile communication network facility 10. FIG. 15 is a schematic diagram illustrating an example of a download instruction 2 according to the fourth embodiment. As illustrated in FIG. 15, the download instruction 2 according to the fourth embodiment includes the "GTP-u header portion" and includes the "download data identification information" and the "data" that included in the "GTP-u payload portion", which are the same information as that illustrated in FIG. 5. The download instruction 2 according to the fourth embodiment differs from the download instruction 2 illustrated in FIG. 5 in that a "data retention period" and a "data existence/nonexistence flag" are additionally included in the "GTP-u payload portion".

The "data retention period" is information that requests the base station device 40 not to delete the data that is stored in the memory in the base station device 40 during the time period indicated in this portion. In the "data existence/nonexistence flag", "0" is stored if data is stored in the base station device 40, whereas "1" is stored if data is not stored in the base station device 40.

In the following, a specific process will be described. If the PGW 20 receives the "download instruction 1" from the AP server 1, the PGW 20 determines, by using the download data identification information or the like, whether the same data is transmitted to the base station device 40 within a predetermined time in the past.

A value that is equal to or slightly smaller than the value used for the "data retention period" described above is preferably set to the predetermined time.

If the PGW 20 determines that the same data has been transmitted to the base station device 40 within the predetermined time period, the PGW 20 sets the "data existence/nonexistence flag" to "1", creates the "download instruction 2" that does not include the download data, and then transmits the "download instruction 2" to the base station device 40.

Because the "data existence/nonexistence flag" in the received "download instruction 2" is "1", the base station device 40 determines that the download data targeted for the transmission is stored in the memory 43. Consequently, after the base station device 40 acquires the download data that is specified by the download data identification information in the "download instruction 2" from the memory 43, the base station device 40 performs the same processes as those performed in the first embodiment or the second embodiment.

In contrast, if the PGW 20 determines that the same data is not transmitted to the base station device 40 within the predetermined time period, the PGW 20 sets the "data existence/nonexistence flag" to "0", creates the "download instruction 2" that includes the download data, and then transmits the created "download instruction 2" to the base station device 40.

Because the "data existence/nonexistence flag" in the received "download instruction 2" is "0", the base station device 40 determines that the download data targeted for the transmission is not stored in the memory 43. Consequently, after the base station device 40 acquires the download data from the AP server 1 by using the download data identification information in the "download instruction 2", the base station device 40 performs the same processes as those performed in the first embodiment or the second embodiment.

By doing so, if the download data has already been stored in the base station device 40, it is possible to inhibit the transmission of the download data from the PGW 20 to the base station device 40, thus improving the band usage rate in the mobile communication network facility 10.

[e] Fifth Embodiment

In a fifth embodiment, a description will be given of an example of preventing a waste or the like of the capacity by efficiently reducing information on download data stored in the memory 43 in the base station device 40.

(Method Performed by Using the Elapsed Time)

FIG. 16 is a schematic diagram illustrating an example of managing download data by using the elapsed time. As illustrated in FIG. 16, the data processing unit 44a stores, as a table in the memory 43, "data", a "timer value", and the "deletion priority order". The "data" is information indicating the download data and stores therein, for example, the same information as the download data identification information. The "timer value" is the elapsed time that is counted after the download data is stored in the memory 43. The "timer value" is stored in the data processing unit 44a or the like.

The "deletion priority order" is the order of the priority that indicates the timer value with the larger value is deleted with priority and is updated by the data processing unit 44a or the like.

In this state, if the capacity of the memory 43 in the base station device 40 exceeds the threshold, the data processing unit 44a deletes the download data from the memory 43 in the order indicated by the "deletion priority order". Consequently, it is possible to prevent a waste or the like of the memory capacity.

(Method Performed by Using the Elapsed Time and the Use Frequency)

FIG. 17 is a schematic diagram illustrating an example of managing download data by using both the elapsed time and use frequency. As illustrated in FIG. 17, the data processing unit 44a stores, as a table in the memory 43, "data", a "timer value (T)", a "use time (N)", "use time/timer value (N/T)", and the "deletion priority order". The "data" and the "timer value" are the same as those illustrated in FIG. 15; therefore, descriptions thereof in detail will be omitted.

The "use time" is the number of times the download data is used, i.e., the number of times a download is performed, and is updated by the data processing unit 44a or the like. The "use time/timer value" is a value obtained by dividing the use time by a timer value and is updated by the data processing unit 44a or the like. The "deletion priority order" is the order of the priority that indicates data with a smaller value of the "use time/timer value" is deleted with priority. The "deletion priority order" is updated by the data processing unit 44a or the like.

In this state, if the capacity of the memory 43 in the base station device 40 exceeds the threshold, the data processing unit 44a deletes the download data from the memory 43 in the order indicated by the "deletion priority order". Consequently, it is possible to prevent a waste or the like of the memory capacity.

(Method Performed by Using the Elapsed Time and a Requested Retention Period)

FIG. 18 is a schematic diagram illustrating an example of managing download data by using both the elapsed time and a requested retention period. As illustrated in FIG. 18, The data processing unit 44a stores, as a table in the memory 43, "data", a "timer value (T)", a "data retention period (Y)", the "remaining time (Y−T), and the "deletion priority order". The "data" and a "timer value" are the same as those illustrated in FIG. 15; therefore, descriptions thereof in detail will be omitted.

The "data retention period" is the retention period of the download data that is specified by the PGW 20. The "data retention period" is extracted by the data processing unit 44*a* or the like from the download instruction 2 and is then stored. The "remaining time" is a value obtained by subtracting a "timer value" from the "data retention period" and is updated by the data processing unit 44*a* or the like. The "deletion priority order" is the order of priority of data indicating that data with a smaller "remaining time" is deleted with priority and is updated by the data processing unit 44*a* or the like.

In this state, if the capacity of the memory 43 in the base station device 40 exceeds the threshold, the data processing unit 44*a* deletes download data from the memory 43 in the order of the "deletion priority order". Consequently, it is possible to prevent a waste or the like of the memory capacity.

[f] Sixth Embodiment

In the above explanation, a description has been given of the embodiments according to the present invention; however, the embodiments are not limited thereto and can be implemented with various kinds of embodiments other than the embodiments described above. Therefore, another embodiment will be described below.

(System)

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings, for example, FIGS. 4 to 8, FIG. 11, and FIGS. 15 to 18, can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

The various processes described in the above embodiments may also be implemented by a program prepared in advance and executed by a computer, such as a personal computer or a workstation. The program can be distributed via a network, such as the Internet. Furthermore, the program is stored in a computer-readable recording medium, such as a hard disk, a flexible disk (FD), a CD-ROM, an MO, and a DVD. Furthermore, the program can also be implemented by a computer reading it from the recording medium.

According to an aspect of an embodiment of a base station device, a data transmission control method, and a data transmission control system disclosed in the present invention, an advantage is provided in that the resource usage can be reduced when multiple terminals download data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station device comprising:
a receiving unit that receives an acquisition request for data group including a plurality of data from a terminal; and
a transmitting unit that transmits, when the acquisition request is received by the receiving unit, data being included in the data group to the terminal, wherein
while the transmitting unit is in the process of transmitting the data to the terminal by using a first transmission line and when an acquisition request for the data group which is requested by the terminal is received from another terminal by the receiving unit, the transmitting unit executes a first transmission and a second transmission in parallel, the first transmission transmitting, to both the terminal and the other terminal by using the first transmission line, data that has not been transmitted to the terminal among the data group, the second transmission transmitting, to the other terminal by using a second transmission line, data that has been transmitted to the terminal among the data group.

2. The base station device according to claim 1, further comprising a determining unit that determines, on the basis of the amount of the data that has been transmitted and the amount of the data that has not been transmitted, whether data is transmitted to the other terminal by using the first transmission line, wherein
when the determining unit determines that the data is transmitted to the other terminal by using the first transmission line, the transmitting unit transmits, to both the terminal and the other terminal by using the first transmission line, the data that has not been transmitted to the terminal and transmits, to the other terminal by using the second transmission line, the data that has been transmitted to the terminal among the data group, and
when the determining unit determines that the data is not transmitted to the other terminal by using the first transmission line, the transmitting unit transmits, to the other terminal by using the second transmission line, the entirety of the data group.

3. The base station device according to claim 1, further comprising a storing unit that stores therein data acquired from a server, wherein
when data associated with an acquisition request that is received by the receiving unit is stored in the storing unit, the transmitting unit reads the associated data from the storing unit and transmits the read data and, when the data associated with the acquisition request is not stored in the storing unit, the transmitting unit acquires the data associated with the acquisition request from the server, transmits the acquired data to the terminal, and stores the acquired data in the storing unit.

4. The base station device according to claim 3, further comprising a deleting unit that deletes data, from among the data stored in the storing unit and starting with the data that has been stored for the longest elapsed time.

5. The base station device according to claim 3, further comprising a deleting unit that deletes data, from among the data stored in the storing unit, in ascending order of a value obtained by dividing the number of times the data is used by the elapsed time since the data is stored.

6. The base station device according to claim 3, further comprising a deleting unit that deletes data, from among the data stored in the storing unit, in ascending order of a value obtained by subtracting the elapsed time since the data is stored from the retention period that is specified for each data.

7. A data transmission control method performed by a base station device, the data transmission control method comprising:
- receiving an acquisition request for data group including a plurality of data from a terminal; and
- transmitting, when the acquisition request is received, the data being included in the data group to the terminal, wherein
- while the data is being transmitted to the terminal by using a first transmission line at the transmitting and when an acquisition request for the data group which is requested by the terminal is received from another terminal at the receiving, the transmitting includes executing a first transmission and a second transmission in parallel, the first transmission transmitting, to both the terminal and the other terminal by using the first transmission line, data that has not been transmitted to the terminal among the data group, the second transmission transmitting, to the other terminal by using a second transmission line, data that has been transmitted to the terminal among the data group.

8. A data transmission control system comprising:
a base station device;
a first terminal; and
a second terminal, wherein
the base station device includes
- a receiving unit that receives an acquisition request for data group including a plurality of data from the first terminal and the second terminal, and
- a transmitting unit that transmits, when the acquisition request is received from the first terminal by the receiving unit, the data being included in the data group to the first terminal, that transmits executes a first transmission and a second transmission in parallel, while transmitting the requested data to the first terminal by using a first transmission line and when an acquisition request for the data group which is requested by the terminal is received from the second terminal by the receiving unit, the first transmission transmitting, to both the first terminal and the second terminal by using the first transmission line, data that has not been transmitted to the first terminal among the data group, the second transmission transmitting, to the second terminal by using a second transmission line, data that has been transmitted to the first terminal among the data group, the first terminal includes
- a transmitting unit that transmits the acquisition request for the data group to the base station device, and
- a receiving unit that receives, by using the first transmission line, the data that is associated with the acquisition request from the base station device, and the second terminal includes
- a transmitting unit that transmits the acquisition request for the data group to the base station device, and
- a receiving unit that receives, from the base station device by using the first transmission line, the data that has not been transmitted to the first terminal and that receives, from the base station device by using the second transmission line, the data that has been transmitted to the first terminal.

* * * * *